June 13, 1939.  G. H. WORRALL  2,162,324
HEATING RADIATOR FOR PROJECTION MACHINES
Filed Nov. 1, 1937   2 Sheets-Sheet 1
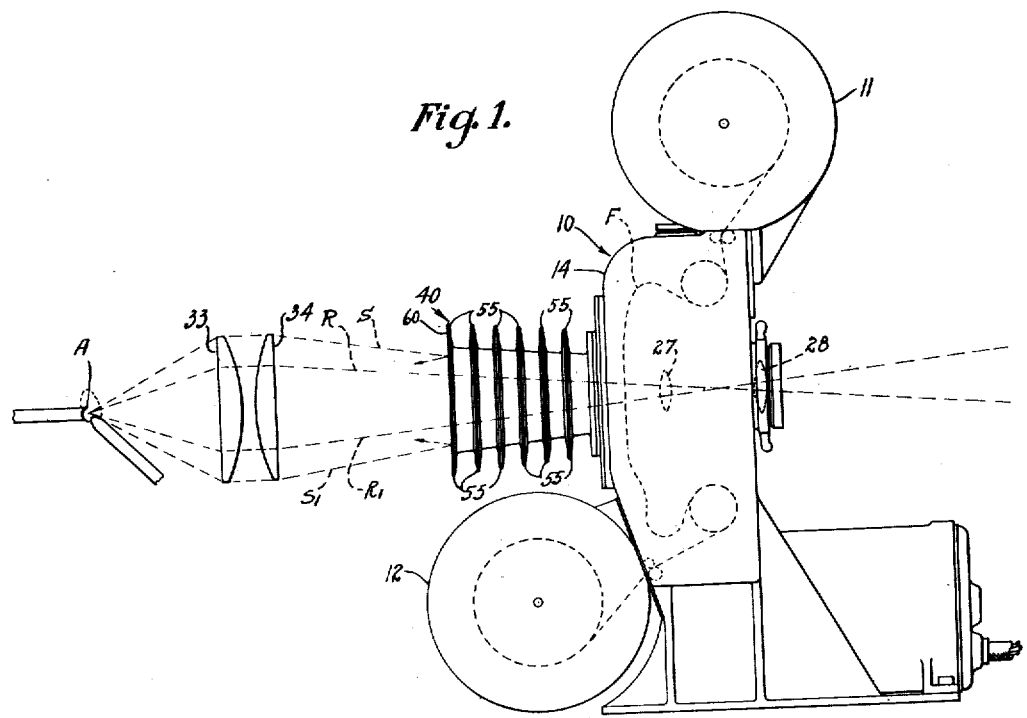
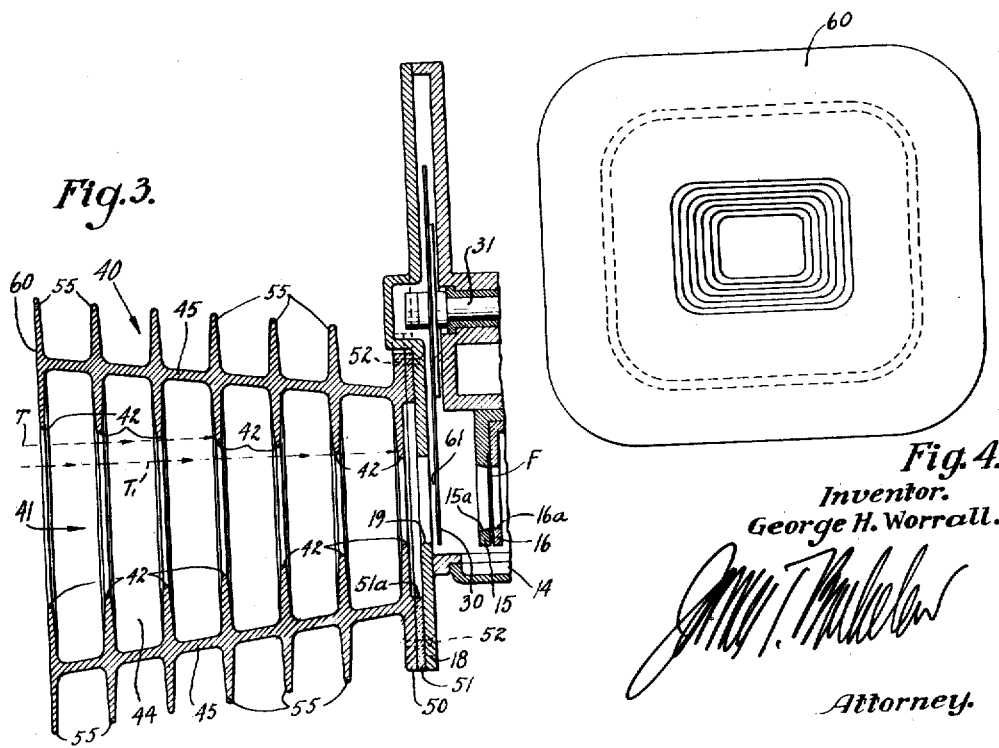
Inventor.
George H. Worrall.
Attorney.

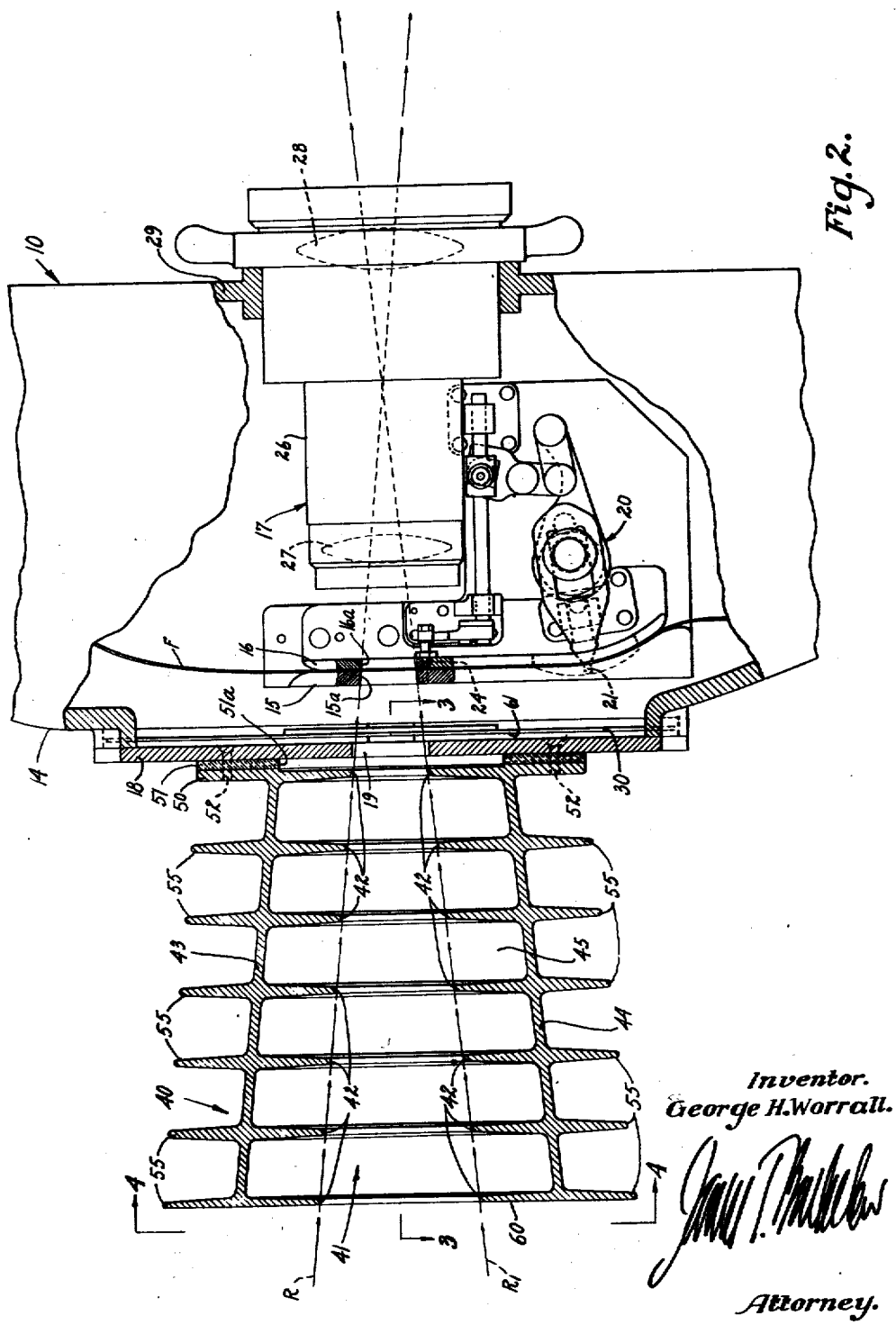

Patented June 13, 1939

2,162,324

UNITED STATES PATENT OFFICE 2,162,324

HEAT RADIATOR FOR PROJECTION MACHINES

George H. Worrall, Los Angeles, Calif., assignor to Mitchell Camera Corporation, West Hollywood, Calif., a corporation of Delaware Application November 1, 1937, Serial No. 172,192

6 Claims. (Cl. 88—24)

This invention relates generally to motion picture projection machines, and more particularly to heat radiating means in projecting machines as typically used in the background projection method of composite motion picture photography.

The background projection method of composite motion picture photography is well understood in the art of motion picture photography. It consists, briefly, in projecting a background scene onto the rearward side of a screen, placing the action in front of the screen, and operating the motion picture camera in front of the screen, in position to photograph simultaneously the action and those portions of the background scene projected on the screen which are not blocked out by the action. One essential requirement is that the background scene be projected on the screen with sufficient light intensity that the exposure of the negative film in the camera to the background component will not be greatly less than the exposure of the negative film to the action, which is always brilliantly lighted. Accordingly, it is necessary to use a background projection light source of very high intensity, and this leads to extreme heating of the background projection machine. The mechanism of the projector, especially the intermittent film movement and register pin mechanism, is precision made for true and accurate performance, but will not operate properly at high temperatures such as are encountered when the desired quantity of light is used, owing to undue expansion of heated members.

It is accordingly a primary object of the invention to reduce the heating of the projection machine by absorbed radiant energy to such an extent that a substantially increased quantity of light can be passed through the machine without exceeding allowable working temperatures.

In accordance with the present invention, a heat absorbing and radiating device is mounted on the rearward wall of the projecting machine, around the usual light entrance opening or door leading into the projector, a heat insulation member, for instance of Pyrex glass or the like, being placed between the device and the projector. This device, which is finished dead black for efficiency of heat absorption and radiation, is provided, in its preferred form, with fins defining the outer limits of the useful light beam travelling from the usual condenser lens or reflector into the machine, and intercepts all rays outside those boundaries, absorbing a large proportion of the heat of the latter. This heat is conducted to radiating fins on the exterior of the device and radiated into the atmosphere. The heat insulation member effectively prevents flow of heat from the heat absorbing and radiating device into the projector, so that the majority of the heat intercepted by the device is radiated to the atmosphere.

As further features of the invention, the rearward end of the heat radiating means and also the rearward face of the shutter of the projection machine are given a polished, heat reflective finish. Thus heat rays striking the rearward end of the device are reflected back rather than absorbed, while the reflective surface on the shutter reflects back the light and heat during times of movement of the film strip.

The invention will be best understood by referring now to the following detailed description of a present preferred embodiment thereof, reference for this purpose being had to the accompanying drawings, in which:

Fig. 1 is a side elevation of a background projection machine and diagrammatically indicated optical system therefor;

Fig. 2 is a fragmentary enlarged view showing a portion of the projector of Fig. 1, with parts broken away, and showing the heat radiator of the present invention in longitudinal vertical section;

Fig. 3 is a horizontal section taken on line 3—3 of Fig. 2; and

Fig. 4 is an elevation looking into the heat radiator, being a view taken as indicated by line 4—4 of Fig. 2.

In the drawings numeral 10 designates generally a background projection machine having film supply magazine 11 at the top and film take up reel 12 at the bottom. The film strip F, which will be understood to carry a background scene, is taken from supply magazine 11 downwardly into the body 14 of the projection machine and is guided to travel downwardly through the film guide way between vertical aperture plates 15 and 16 placed to the rear of projection lens or objective 17, the film strip having said guide way being moved and guided by any usual means to enter take up magazine 12. Aperture plates 15 and 16 are provided with usual registering apertures 15a and 16a, respectively, each of the size of a film frame, located on the optical axis of objective 17, and the rear housing wall 18 of the projection machine is provided with an aperture 19 alined with but slightly larger than apertures 15a and 16a.

The film strip is intermittently advanced by an intermittent film movement mechanism generally indicated at 20, which may be of any suitable type, though I illustrate a preferred film movement of the type shown in Patent No. 1,930,723 to George A. Mitchell. This intermittent film movement mechanism is provided with claw pins 21 which intermittently engage the perforations at opposite edges of the film strip, pull the film downwardly by a distance equal to a frame length, and then withdraw from the film to return for the next pull down. The film is steadied at the exposure aperture by pilot or register pins 24 which engage the film perforations between the times of movement of the film by the intermittent movement mechanism. Pins 24 are interconnected with the intermittent film movement in such a manner as to engage the film alternately therewith. Film movement and register pin mechanism for so alternately moving and steadying the film is well known in the art, while the particular mechanism illustrated is completely disclosed in the aforesaid Mitchell patent, and no further description thereof is accordingly deemed necessary herein.

Objective 17 is here diagrammatically indicated as comprising a suitable lens mount 26 carrying two spaced lens components 27 and 28, mounted within front housing wall 29. It will be understood that objective 17 is so located with reference to the film frame in register at projection apertures 15a and 16a as to form an enlarged projection image of said frame on the background of the projection screen, not illustrated. A shutter 30 is provided between the aperture 19 in rear housing wall 18 and projection aperture 15a, being shown as mounted on a rotatable shaft 31 understood to be driven in synchronism with the intermittent film movement mechanism in such a manner as to uncover aperture 19 for the entrance of projection light each time the film strip comes to rest, and to again cover over aperture 19 just before the film strip is again moved by the intermittent mechanism.

The light source for the projector is diagrammatically indicated as a carbon arc A located in line with and to the rear of projection light opening 19 in the rear wall 18 of the projector. A pair of condenser lenses 33 and 34 placed between arc A and the projector receive light from the arc and bring it to a focus at objective 17, the light rays converging from the condensers passing through opening 19 and the film frame registered at apertures 15a and 16a to converge to a source image located preferably between projection lens components 27 and 28. It will be understood that the background image on the film frame registered at apertures 15a and 16a, thus illuminated with light from the condensers, will be projected by objective 17 onto the background projection screen. Of course, while condensers are here shown for illustrative purposes, a reflector might equally well be used, and is to be considered the equivalent of the arrangement shown.

The projector and optical system as so far described is of course of a general type well known in the art. The present invention provides a heat radiation means for dissipating the heat accompanying the non-useful portions of the condenser light otherwise received by the projection machine.

The heat radiator of the present invention comprises a casting 40, formed of aluminum or other good heat conductive material, secured to but heat-insulated from the rearward housing wall 18 of the projector. The casting is mounted on wall 18 around light entrance aperture 19, and has a converging light passing channel 41 alined with said opening. Channel 41 is defined by the edges of a plurality of vertical, parallel flanges or fins 42 extending inwardly from converging top and bottom walls 43 and 44, respectively, and converging side walls 45. The channel 41 defined by fins 42 coincides with the outer boundary of the useful converging light beam passing from condenser lenses 33 and 34 through rear aperture or door 19, apertures 15a and 16a, and coming to a focus at the objective. Thus successive fins 42, counting from left to right in Fig. 2, define rectangular apertures, all similar in shape to projection apertures 15a and 16a, but of progressively decreasing sizes, each of such rectangles being of substantially the size and shape of the cross-sectional area of the useful light beam at that point between the condensers and objective.

The end of casting 40 adjacent housing wall 18 has a mounting flange 50, which comes against a heat insulation plate 51 having a light aperture 51a, said plate preferably consisting of Pyrex glass or other high heat resistant material of low heat conduction properties, and being mounted against wall 18, screws 52 securing the described members in assembly.

Casting 40 has external heat radiating fins 55 placed opposite internal heat intercepting fins 42.

Both the internal heat intercepting and absorbing fins 42 and the external heat radiating fins 55, as well as the inner and outer surfaces of walls 43, 44 and 45, are finished a full dead black, so that the efficiency of heat absorption by inner fins 42, as well as of heat radiation by external fins 55, will be a maximum.

The plane rearward face 60 of the radiator and the rearward face 61 of shutter 30 are polished and function as a heat ray reflector.

The light passed through the radiator is bounded above and below by extreme rays such as R and R', respectively, the latter being defined by the edges of fins 42, as indicated in Figs. 1 and 2. Rays outside rays R and R' ahead of the radiator, such as rays S and S' in Fig. 1, strike the reflective surface 60 on the radiator and are reflected rearwardly without substantial heat absorption. Irregular rays, such as T and T' in Fig. 3, travelling at angles such as to pass outside the boundary rays R and R' within the confines of the radiator, are intercepted by fins 42 and absorbed thereby. The ordinary condenser assembly used in connection with an arc produces a substantial proportion of such non-useful rays as T and T', and all of these are intercepted by fins and largely absorbed thereby. The heat so absorbed by the fins is rapidly conducted to radiating fins 55 and radiated therefrom into the atmosphere. The heat intercepted and absorbed by the radiator is prevented from flowing to the projector mechanism by the heat insulation plate 51. During the time the film in the projector is being moved, the radiant energy strikes the reflective surface on the rear side of the shutter and is therefore reflected rearwardly rather than being absorbed by the shutter and conducted to the projector mechanism.

The effectiveness of the provisions of the present invention are demonstrated by the fact that the rear wall of the projector remains at a temperature approximately 100° F. below the temperature of the forward or small end of the radiator. The device reduces the operating temperature of the projector approximately 100° F. for equal quantity of light, or permits a greatly increased quantity of light to be passed through the projector without increasing its temperature above a normal level.

A projector equipped with the device of the present invention is accordingly capable of projecting a background scene on a screen at greatly increased light intensity—a result particularly desired in background projector work. It is of course to be understood that the present invention is not restricted to use on a projector intended solely for background projector work, but is useful and generally applicable to any picture projection machine in which a relatively large quantity of light must be handled, or in which heat is a problem.

I claim:

1. In combination with a projection machine having a projection aperture and means for projecting a converging beam of light through a film frame at said aperture, heat absorbing and radiating means disposed to the rear of said projection machine, said means comprising a wall surrounding and converging with said converging light beam and provided with inwardly extending fins disposed in planes extending transversely and spaced longitudinally of said light beam, the bounding edges of said fins defining said converging light beam and said fins being adapted to intercept and absorb stray radiant energy outside the portion of said beam that passes through the film frame at the projection aperture, and heat insulation means supporting said heat absorbing and radiating means on the projection machine.

2. In combination with a projection machine having a projection aperture and means for projecting a converging beam of light through a film frame at said aperture, heat absorbing and radiating means disposed to the rear of said projection machine, said means comprising a well surrounding said converging light beam and provided with inwardly extending fins disposed in planes extending transversely and spaced longitudinally of said light beam, the bounding edges of said fins converging with and defining said converging light beam and said fins being adapted to intercept and absorb stray radiant energy outside the portion of said beam that passes through the film frame at the projection aperture, heat insulation means supporting said heat absorbing and radiating means on the projection machine, and a plurality of outwardly extending fins on said wall formed in the planes of said inwardly extending fins and adapted to radiate heat to the surrounding atmosphere.

3. In combination with a projection machine having a projection aperture and means for projecting a converging beam of light through a film frame at said aperture, heat absorbing and radiating means disposed to the rear of said projection machine, said means comprising a wall surrounding and converging with said converging light beam and provided with inwardly extending black-surfaced fins disposed in planes extending transversely and spaced longitudinally of said light beam, the bounding edges of said fins defining said converging light beam and said fins being adapted to intercept and absorb stray radiant energy outside the portion of said beam that passes through the film frame at the projection aperture, heat insulation means supporting said heat absorbing and radiating means on the projection machine, and a plurality of outwardly extending black-surfaced fins on said wall formed in the planes of said inwardly extending fins and adapted to radiate heat to the surrounding atmosphere.

4. In combination with a projection machine having a projection aperture and means for projecting a converging beam of light through a film frame at said aperture, heat absorbing and radiating means disposed to the rear of said projection machine, said means comprising a wall surrounding and converging with said converging light beam and provided with inwardly extending black-surfaced fins disposed in planes extending transversely and spaced longitudinally of said light beam, the bounding edges of said fins defining said converging light beam and said fins being adapted to intercept and absorb stray radiant energy outside the portion of said beam that passes through the film frame at the projection aperture, heat insulation means supporting said heat absorbing and radiating means on the projection machine, and a heat reflective surface on the rearward end of said heat absorbing and radiating means.

5. In combination, a projection machine having a projection aperture, means for supporting a film strip at said aperture, a rotatable shutter in back of said aperture and film strip, a heat reflective surface on the rearward side of said shutter, means for projecting a converging beam of light through a film frame at said aperture, and heat absorbing and radiating means disposed to the rear of said projection machine, said means comprising a wall surrounding and converging with said converging light beam and provided with inwardly extending fins disposed in planes extending transversely and spaced longitudinally of said light beam, the bounding edges of said fins defining said converging light beam and said fins being adapted to intercept and absorb stray radiant energy outside the portion of said beam that passes through the film frame at the projection aperture, and heat insulation means supporting said heat absorbing and radiating means on the projection machine.

6. In combination with a projection machine having a projection aperture and means for projecting a converging beam of light through a film frame at said aperture, heat absorbing and radiation means disposed to the rear of said projection and adapted to be supported thereby, said means comprising a wall surrounding and converging with said converging light beam and provided with inwardly extending fins disposed in planes extending transversely and spaced longitudinally of said light beam, the bounding edges of said fins defining said converging light beam and said fins being adapted to intercept and absorb stray radiant energy outside the portion of said beam that passes through the film frame at the projection aperture, and a heat insulation gasket interposed between the rear side of the projection machine and the forward end of said heat absorbing and radiating means.

GEORGE H. WORRALL.

CERTIFICATE OF CORRECTION.

Patent No. 2,162,324.  June 13, 1939.

GEORGE H. WORRALL.

It is hereby certified that error appears in the printed specification of the above numbered patent requiring correction as follows: Page 3, first column, line 42, claim 2, for the word "well" read wall; and that the said Letters Patent should be read with this correction therein that the same may conform to the record of the case in the Patent Office.

Signed and sealed this 1st day of August, A. D. 1939.

(Seal)

Henry Van Arsdale,
Acting Commissioner of Patents.